May 7, 1946.    D. A. WALLACE    2,400,055
TUBE FORMING APPARATUS AND METHOD
Filed Oct. 23, 1943    2 Sheets-Sheet 1
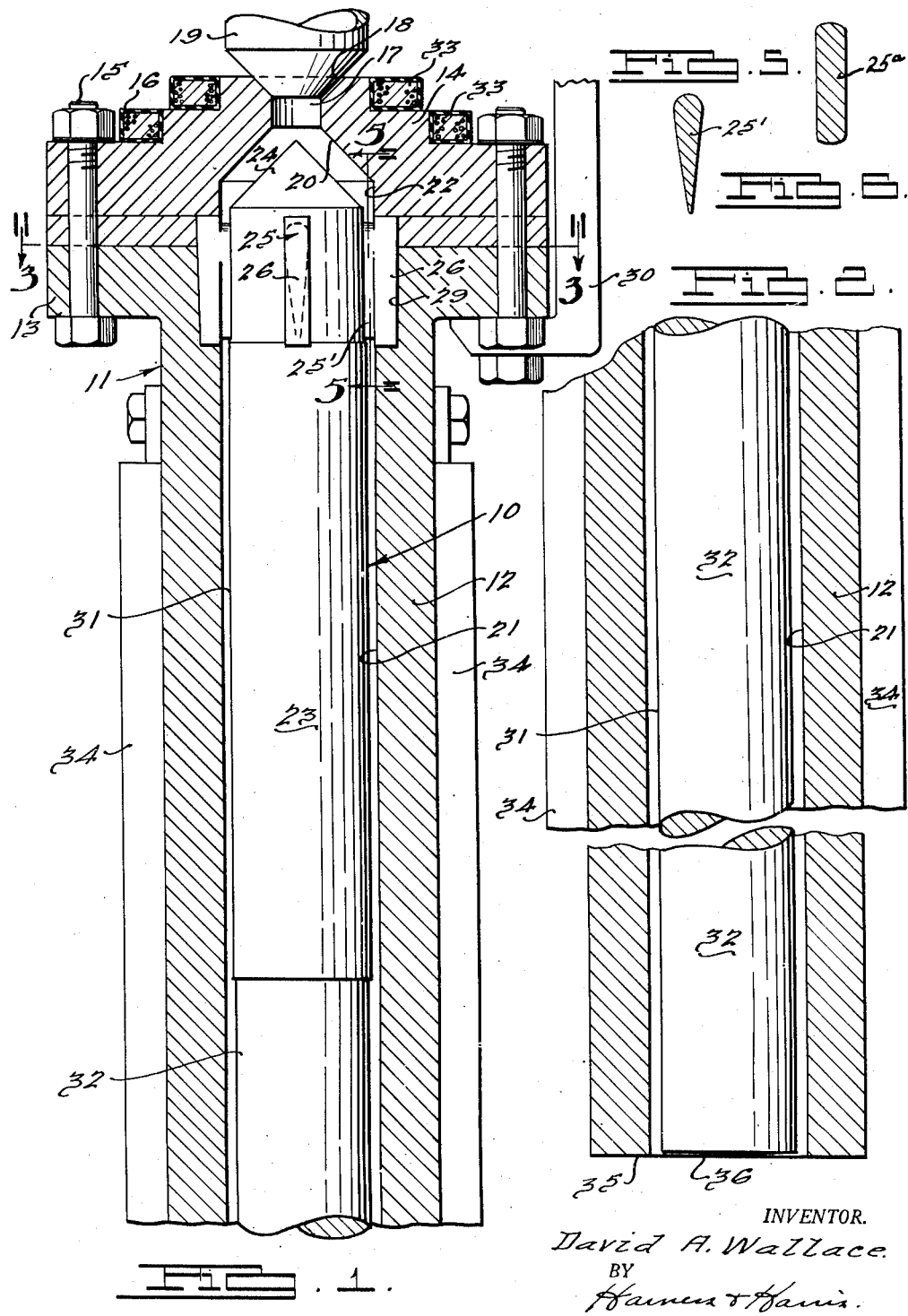
INVENTOR.
David A. Wallace.
BY
Haines & Harris
ATTORNEYS.

May 7, 1946.　　　　D. A. WALLACE　　　　2,400,055
TUBE FORMING APPARATUS AND METHOD
Filed Oct. 23, 1943　　　2 Sheets-Sheet 2
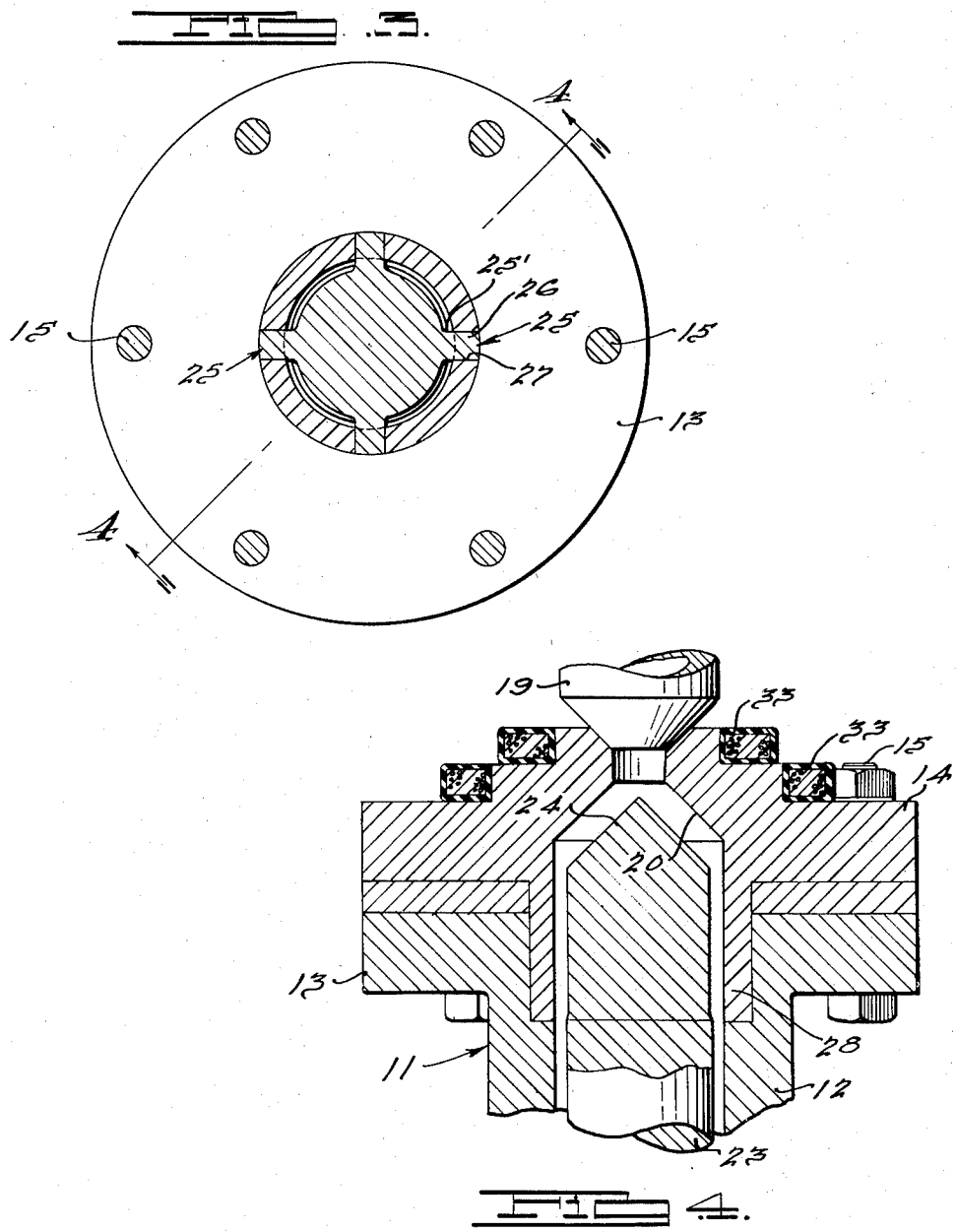
INVENTOR.
David A. Wallace.
BY
Hansen & Harris
ATTORNEYS.

Patented May 7, 1946

2,400,055

UNITED STATES PATENT OFFICE 2,400,055

TUBE FORMING APPARATUS AND METHOD

David A. Wallace, Detroit, Mich., assignor to Chrysler Corporation, Highland Park, Mich., a a corporation of Delaware Application October 23, 1943, Serial No. 507,361

7 Claims. (Cl. 18—14)

This invention relates to an improved tube extruding apparatus and method.

More particularly the invention pertains to improvements in apparatus and method for forming tubing from a large variety of extrudable materials including thermoplastic and thermosetting resins, natural and synthetic rubber compounds, and any other material capable of being discharged under pressure in a flowable state and subsequently rigidified or set.

One of the main objects of the invention is the provision of a tube forming apparatus and method by which tubing of relatively great lengths can be produced to closely held limits of internal and external dimensions.

Another object of the invention is to provide apparatus of this kind which is particularly adapted to form substantially completely cured tubing from thermosetting resin in a continuous operation.

Other objects of the invention are to provide a vertically disposed tube forming die in apparatus of this kind which facilitates vertical suspension of successive increments of newly formed tubing and obviates lateral deformation thereof under its own weight or by frictional resistance to movement; to provide inner and outer die parts and means for supporting the inner die part from the outer die part in vertically suspended relation which are so constructed and arranged as to mitigate separation of the material forced between the dies into spaced ribbons; to provide reduced clearance between the inner and outer die parts on the down stream side of the inner die part supporting means which subjects the material to compression sufficient to cause the material to flow together after portions thereof have been separated in flowing past the supporting means and while the material is still in condition to reform into an integral body; and to provide a section of reduced clearance of this kind between the die parts which is predetermined in length to predetermine the axial compression to which the material is subjected as a result of forcing it between the die parts.

Additional objects of the invention are to provide in apparatus of this kind means for heating the material or increasing the heat previously applied thereto as it is injected between the die parts in order to plasticize it to a more flowable state and, in case of extrusion of thermosetting or vulcanizable material, to bring it to substantially a curing temperature; to provide additional heating means for maintaining a predetermined portion of the die parts at or above the curing temperature of such material and to so predetermine the length of the heated portion of the die parts with respect to the rate at which the material passes therethrough as to cure the material by the time it leaves the die.

An illustrative embodiment of the invention is shown in the accompanying drawings, in which:

Fig. 1 is a fragmentary, central, vertical, sectional view of the upper portion of a tube-forming apparatus embodying the invention and illustrating the preferred position of the die parts thereof.

Fig. 2 is a fragmentary, central, vertical, sectional view of the lower portion of the tube-forming apparatus, the upper portion of which is shown in Fig. 1.

Fig. 3 is a horizontal sectional view taken on line 3—3 of Fig. 1.

Fig. 4 is a fragmentary, central, vertical, sectional view taken on line 4—4 of Fig. 3.

Fig. 5 is a fragmentary, vertical, sectional view taken on line 5—5 of Fig. 1.

Fig. 6 is a fragmentary, vertical, sectional view similar to Fig. 5 but showing a modified form of the invention.

In the form of the invention illustrated in the drawings, my improved tube-forming apparatus comprises inner and outer die parts generally designated by the numerals 10 and 11, respectively. The outer die part comprises a cylindrical main body portion 12 and a head portion formed by a radially extending flange 13 on the upper extremity of the cylindrical body portion 12 and a cap member 14 which is adapted to be firmly clamped in sealed relation upon the upper side of the flange 13 by bolts 15. A gasket 16 comprising suitable compressible material may be interposed between the flange 13 and the cap 14, if desired.

The cap 14 is provided with an inlet passage 17 which has a frusto-conical upper section 18 for providing a seat against which a nozzle 19 may be engaged for introducing extrudable material into the interior of the outer die part 12. The nozzle 19 comprises a discharge outlet of apparatus (not shown) of the type used for discharging under pressure extrudable material such as plastic, rubber and similar compounds. Formed in the interior of the cap 14 is a lower conical bore 20 which communicates at its upper end with the inlet passage 17 and which is substantially concentric with the cylindrical bore 21 of the main body portion 12 of the die member 11. A cylindrical bore 22 joining the lower end of the frusto-conical bore 20 is also provided in the cap 14 in axial registration with the bore 21.

Disposed in the passage 21 of the die member 11 is a cylindrical inner die member 23 which has a conical upper end section 24 concentrically arranged with respect to the conical bore 20. The tapered wall of the conical section 24 is substantially parallel with the tapered wall of the conical bore 20 and the section 24 extends into the conical bore 20, as illustrated in Fig. 1. In the form of the invention illustrated in Figs. 1 and 5, the inner die member 23 is suspended in vertical position by radially extending lugs, generally designated by the numeral 25, which project outwardly from a section of the inner die member 23 immediately adjacent and below the conical end section 24 thereof. Each of these lugs includes a neck portion 25' of air foil cross section, as illustrated in Fig. 5, and an outer portion 26 of rectangular cross section which is seated in a slot 27 formed in a sleeve 28 which depends downwardly from the cap 14. The sleeve 28 and outer portions 26 of the lugs 25 are received in a counter bore 29 formed in the flange 13 and upper end portion of the body portion 12 of the outer die member 11. The necks 25' of air foil cross section span the space between the outer die member 10 and the inner die member 11 and they are so formed as to assist in causing the strips of extrudable material separated thereby to flow together into a unitary structure after the material has proceeded downwardly beyond the location at which the inner die member is supported in vertically suspended relationship. Both of the die members are supported in vertical position by support means 30 to which they are clamped by the bolts 15, or by other suitable means.

The cross section of the space between the body portion 12 of the outer die member 13 and the upper section 31 of the inner die member which is received therein, is sufficiently smaller than the summation of the passages between the inner and outer die members which are separated by the necks 25' to cause the extruded material which flows through the latter passages to be compressed together circumferentially into a unitary structure. The length of the section 31 which is of increased diameter in order to perform this function is so predetermined as to establish the axial and circumferential compression to which the extrudable material is subjected during operation of the apparatus. Friction between the walls of the bore 21 and the outer surface of the section 31 of the inner die member opposes downward movement of the extrudable material, thus subjecting it to compression under the pressure by which it is introduced between the die members and therefore the length of this section of the inner die member directly controls the extent of compression to which the material is subjected. The lower section 32 of the inner die member 23 is of reduced diameter and therefore accommodates free flow of the extrudable material when the latter reaches this position between the die members.

The extrudable material is preferably heated to a somewhat flowable state in the apparatus (not shown) from which it is discharged through the nozzle 19. This material is kept in a state of flowable plasticity by application of heat to the cap 14 by heating elements 33 provided thereon. Heat is also supplied to the material during its passage through the upper end portion of the space between the inner and outer die members by heating elements 34 mounted on the sides of the main body portion 12 of the outer die member. If the extrudable material is of a thermoplastic nature it may be found necessary to heat the material only in the discharge apparatus (not shown) or in addition, as it passes through the cap 14 and/or by the upper section 31 of the inner die member 23. The latter heating operation may be controlled by predetermining the lengths of the heating elements 34.

My improved tube forming apparatus is, however, particularly adapted for forming tubing from thermosetting extrudable material or material which vulcanizes to a set stage such as rubber compounds or otherwise requires heat to convert it to a set state. In forming tubing from extrudable material of such character, the lengths of the heating elements 34 and the temperature at which they maintain the portions of the inner and outer die members along which they extend are predetermined with respect to the rate of movement of the material between the die members to establish a heat-curing period of the desired duration and temperature. The duration and temperature of the heat-curing period is preferably predetermined to substantially completely cure the material by the time it leaves the lower ends of the outer and inner die members, shown at 35 and 36, respectively, in Fig. 2. If desired, the curing operation may be only partially conducted between the inner and outer dies in the foregoing manner in order to bring the resulting tubular structure to a semi-cured but self-sustaining state and further curing may be conducted in an oven. In forming tubing from thermoplastic material, the lower end portions of the die members may be cooled by atmosphere or other cooling means (not shown) in order to convert the material to a solid state by the time it leaves the die. By disposing the foregoing die members in a vertical position and discharging tubing formed therebetween vertically downwardly, the material from which the tubing is produced is uniformly distributed throughout the space between the die members and no provision of supports is required for receiving the tubing as it leaves the die. The tubing formed from thermosetting material or other heat-curing material is produced in the above manner. It leaves the die in a heated state and might, in some cases, be subjected to deformation by contact with supports. When the tubing is discharged downwardly from vertically positioned dies, danger of deformation by supporting it immediately following discharge is effectively guarded against. The tubing may be brought to any desired length by placing the forming apparatus at a selected height. For example, the forming apparatus may be located on an upper floor of the plant and the tubing may be discharged downwardly through one or more floors of the building in which a plant is located. Any suitable pressure discharge apparatus may be used. It has been found that plastic injecting apparatus of the type shown in application Serial Nos. 410,233, now Patent No. 2,362,469, 471,693, and 478,617, now Patent No. 2,367,204, which is adapted to continuously discharge such material may be advantageously used in connection with tube forming apparatus embodying my invention.

The neck portions 25' of the lugs 25 may be of rectangular cross section, as illustrated at 25ᵃ in Fig. 6. In any event, the width of these neck sections should be made as small as possible to mitigate the effect of separating the extrudable material into spaced strips during its introduction between the inner and outer die members.

Although but several embodiments of the invention are hereby shown and described, it will be understood that various changes in the sequence of operations, steps and materials employed may be made without departing from the spirit of the invention.

I claim:

1. Apparatus for forming tubing from extrudable material including an outer die member comprising a main body portion having a cylindrical bore therein and a cap therefor provided with an inverted frusto-conical cavity having its larger end adjacent and registering with said cylindrical bore, said cap having an inlet opening communicating with the small end of said cavity in substantially direct axial alignment with said bore, means for detachably securing said cap on an end of said cylindrical section, means for supporting said outer die part in vertically upright position with said inlet opening facing upwardly, an inner die member disposed in said outer die member having a cylindrical body part smaller than and disposed concentrically with respect to said bore and having a conical extremity extending into said cavity in spaced relation to the wall thereof for maintaining a layer of said material of predetermined thickness in heat-receiving relationship with the wall of said cavity as it flows therethrough, flanges on the upper end portion of said inner die member clamped between said cap and the main body portion of said outer die member for supporting said inner die member in vertically suspended position, and means for heating said cap in order to maintain extrudable material entering said inlet and cavity in a state of flowable plasticity.

2. Apparatus for forming tubing from extrudable material including an outer die member comprising a main body portion having a cylindrical bore therein and a cap therefor provided with an inverted frusto-conical cavity having its larger end adjacent and registering with said cylindrical bore, said cap having an inlet opening communicating with the small end of said cavity in substantially direct axial alignment with said bore, means for detachably securing said cap on an end of said cylindrical section, means for supporting said outer die part in vertically upright position with said inlet opening facing upwardly, an inner die member disposed in said outer die member having a cylindrical body part smaller than and disposed concentrically with respect to said bore and having a conical extremity extending into said cavity in spaced relation to the wall thereof for maintaining a layer of said material of predetermined thickness in heat-receiving relationship with the wall of said cavity as it flows therethrough, flanges on the upper end portion of said inner die member clamped between said cap and the main body portion of said outer die member for supporting said inner die member in vertically suspended position, means for heating said cap in order to maintain extrudable material entering said inlet and cavity in a state of flowable plasticity, and means for heating said main body portion of said outer die member in order to heat cure said extrudable material during its passage therethrough.

3. The method of making tubing from extrudable material which comprises the steps of injecting such material under pressure vertically downwardly between co-axially arranged inner and outer vertically disposed die members, maintaining said material under compression during its travel between sections of said die members of predetermined lengths by reducing the thickness of the body of such material, partially solidifying said material during its passage between said sections of said die members and while it is under compression, relieving the compression on the partially solidified material as it leaves said sections of said die members by passing it between adjacent sections of said die members having a greater space therebetween than that of said first mentioned sections of said die members, and further solidifying said material after said compression has been relieved and during its passage between said adjacent sections of said die members.

4. The method of making tubing from extrudable heat-curable material which comprises the steps of injecting such material under pressure vertically downwardly between co-axially arranged inner and outer vertically disposed die members, heating said material during its introduction into said dies to a state of flowable plasticity, maintaining said material under compression during its passage between sections of said dies of predetermined lengths, partially heat curing said material while under compression between said sections of said die members by heating the latter, completing the curing of said material during passage thereof through adjacent sections of said die members having a greater space between them than that of said first mentioned die sections and having a length predetermined with respect to the rate of movement of said material therethrough to cure the latter to a desired extent, and suspending the resulting cured tubing in vertically downwardly extending relation from the outlet ends of said die members and in atmosphere until cooled.

5. The method of making tubing from extrudable material which comprises the steps of injecting such material while heated to a state of flowable plasticity under pressure between coaxially arranged inner and outer die members, maintaining said material under compression during its travel between sections of said die members of predetermined lengths by reducing the thickness of the body of such material, partially solidifying said material during its passage between said sections of said die members and while it is under compression, relieving the compression on the partially solidified material as it leaves said sections of said die members by passing it between adjacent sections of said die members having a greater space therebetween than that of said first mentioned sections of said die members, and further solidifying said material after said compression has been relieved and during its passage between said adjacent sections of said die members.

6. The method of making tubing from extrudable heat-curable material which comprises the steps of injecting such material under pressure and while heated to a state of flowable plasticity between coaxially arranged inner and outer die members, maintaining said material under compression during its passage between sections of said dies of predetermined lengths, partially curing said material while under compression between said sections of said die members by heating the latter, further curing said material during passage thereof through adjacent sections of said die members having a greater space between them than that of said first mentioned sections of said die members and having a length predetermined with respect to the rate of movement of said material therethrough to cure the latter to a desired extent, and allowing the resulting cured tubing to cool in atmosphere.

7. Apparatus for forming tubing from extrudable heat-curable material comprising an outer die member having an inlet at one extremity and an outlet at its opposite extremity and having a passage connecting said inlet and outlet, an inner die member disposed coaxially of said passage in spaced relation to the wall thereof, means for introducing extrudable material under pressure into said inlet and the space between said die members, the space between registering sections of said inner and outer die members located at the inlet end portion of the latter being smaller than the space between longitudinally adjacent registering sections of said inner and outer die members located at the outlet end portion of said outer die member and said first mentioned registering sections being of such length and so spaced as to predetermine the compression to which such material is subjected during its passage therebetween under the pressure applied at said inlet, the space between said second mentioned registering sections being predetermined to accommodate relatively free passage of said material therethrough without subjecting it to substantial additional compression, means for heating said material during its passage through the space between said first mentioned registering sections of said die members to partially cure said material while under compression, and for heating said material during its passage through the space between said second mentioned registering sections to further cure it, said second mentioned registering sections of said die members being predetermined in length with respect to the rate of movement of said material therethrough to cure the latter to a desired extent.

DAVID A. WALLACE.